T. J. Barnes,
Harness Yoke.
N° 70,502. Patented Nov. 5, 1867.
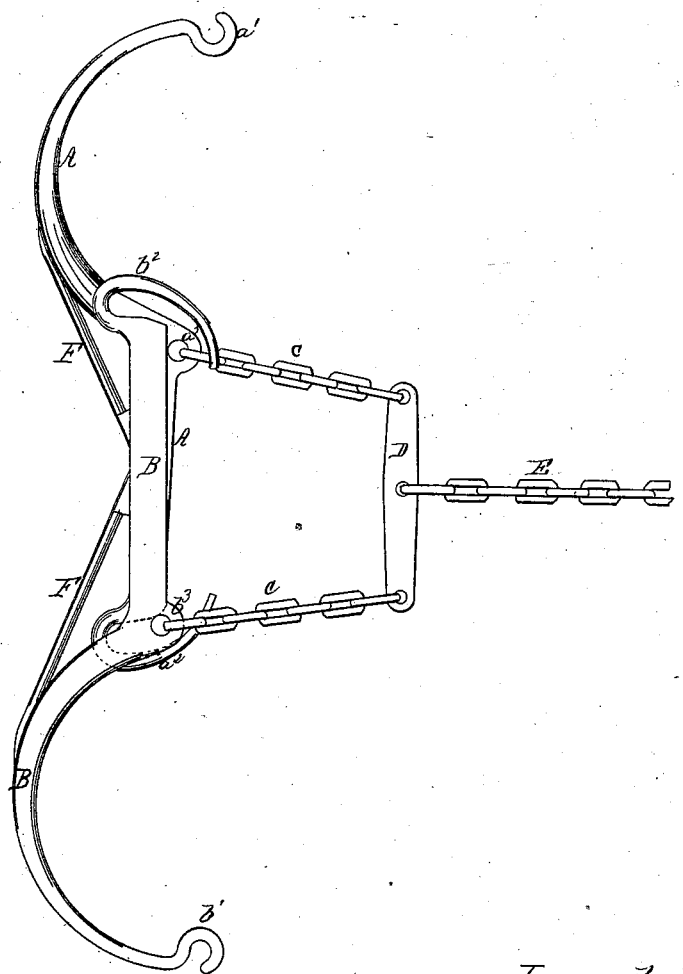
Witnesses:
J. Alison Fraser
Wm Trewin
Inventor:
T. J. Barnes
Per Munn & Co
Attorneys

United States Patent Office.

THOMAS J. BARNES, OF CAMBRIDGE, ILLINOIS.

Letters Patent No. 70,502, dated November 5, 1867.

---

IMPROVEMENT IN HORSE-YOKES.

---

*The Schedule referred to in these Letters Patent and making part of the same.*

---

TO ALL WHOM IT MAY CONCERN:

Be it known that I, THOMAS J. BARNES, of Cambridge, in the county of Henry, and State of Illinois, have invented a new and useful Improvement in Horse-Yokes; and I do hereby declare that the following is a full, clear, and exact description thereof, which will enable others skilled in the art to make and use the same, reference being had to the accompanying drawings forming part of this specification.

The figure is a top or plan view of my improved horse-yoke.

My invention has for its object to simplify the construction of harness, and at the same time furnish an arrangement by the use of which the horses may be worked close up to trees, fences, &c., without injuring the trees or catching upon the fences; and it consists in the construction of the yoke, and in the combination therewith of two short chains and a short equalizing-bar, the whole being constructed and arranged as hereinafter more fully described.

The yoke is made in two parts, A and B, which are made exactly alike. The parts A and B are made about three and a half feet long, and of a size proportioned to the kind of work to be done, or the amount of draught to be applied to them. The outer ends of each part are bent or curved, as shown in the drawing, so as to pass around the breast of the horse, beneath his neck, and rest upon the collar. The inner ends of the said parts are made straight, as shown. Upon the ends of the parts A and B are formed hooks $a^1$ $a^2$ and $b^1$ $b^2$, and at the centres of draught are formed eyes $a^3$ and $b^3$, to which are attached the forward ends of the short chains C, the rear ends of which are attached to the ends of the short equalizing-bar D, to the centre of which the draught-chain E is attached. In using the yoke, the hook $a^1$ of the part A is hooked into the outer hame-ring of the off horse, and the hook $a^2$ into the inner hame-ring of the near horse. In the same manner the hook $b^1$ of the part B is hooked into the outer hame-ring of the near horse, and the hook $b^2$ into the inner hame-ring of the off horse.

By this construction the horses are enabled to work close up to trees and fences, without injuring the trees or catching upon the fences, double-trees, whiffle-trees, clevises, &c., being wholly dispensed with. This yoke can be put upon large or small horses without change, and the bar D equalizes the draught, so that should one of the horses walk a little ahead of the other, each may still draw his proper proportion of the load. F are braces, which may be formed upon or attached to the parts A and B of the yoke, as shown in the drawing, to strengthen them at the points or angles where the draught is applied.

I claim as new, and desire to secure by Letters Patent—

1. An improved horse-yoke, made in two parts, A and B, and in substantially the form and manner herein shown and described.

2. The combination of the short chains C and equalizing-bar D, to which the draught-chain is attached, with the parts A and B of the yoke, substantially as herein shown and described, and for the purpose set forth.

The above specification of my invention signed by me this 5th day of August, 1867.

THOS. J. BARNES.

Witnesses:
W. L. DALRYMPLE,
WILLIAM NYE.